United States Patent
Briscoe et al.

(10) Patent No.: US 7,937,472 B2
(45) Date of Patent: May 3, 2011

(54) PROCESSING OF DATA IN NETWORKS

(75) Inventors: Robert J Briscoe, Woodbridge (GB);
Andrea Soppera, Ipswich (GB);
Arnaud Jacquet, Ipswich (GB)

(73) Assignee: British Telecommunications public limited company, London (GB)

( * ) Notice: Subject to any disclaimer, the term of this patent is extended or adjusted under 35 U.S.C. 154(b) by 1155 days.

(21) Appl. No.: 11/579,374

(22) PCT Filed: May 9, 2005

(86) PCT No.: PCT/GB2005/001737
§ 371 (c)(1),
(2), (4) Date: Nov. 2, 2006

(87) PCT Pub. No.: WO2005/109783
PCT Pub. Date: Nov. 17, 2005

(65) Prior Publication Data
US 2008/0091766 A1 Apr. 17, 2008

(30) Foreign Application Priority Data
May 7, 2004 (GB) .................................. 0410254.7

(51) Int. Cl.
*G06F 15/16* (2006.01)
(52) U.S. Cl. ........................ 709/226; 709/202; 370/254
(58) Field of Classification Search .......... 709/223–226, 709/200–202; 370/238, 254
See application file for complete search history.

(56) References Cited

U.S. PATENT DOCUMENTS

| | | | |
|---|---|---|---|
| 6,023,453 | A | 2/2000 | Ruutu et al. |
| 6,160,793 | A | 12/2000 | Ghani et al. |
| 6,490,327 | B1 * | 12/2002 | Shah .............................. 375/341 |
| 6,618,382 | B1 | 9/2003 | Divivier et al. |
| 6,754,188 | B1 * | 6/2004 | Garahi et al. ................. 370/328 |
| 2003/0128687 | A1 * | 7/2003 | Worfolk et al. ............... 370/351 |
| 2005/0018617 | A1 * | 1/2005 | Jin et al. ........................ 370/252 |
| 2005/0102398 | A1 * | 5/2005 | Zhang et al. .................. 709/225 |

FOREIGN PATENT DOCUMENTS
EP 1209861 A1 5/2002

OTHER PUBLICATIONS
International Search Report dated Sep. 6, 2005.
GB Search Report dated Oct. 5, 2004.

* cited by examiner

*Primary Examiner* — Moustafa M Meky
(74) *Attorney, Agent, or Firm* — Nixon & Vanderhye P.C.

(57) ABSTRACT

A processing node for processing data items in a data network, comprising means for receiving data items, means for receiving characterization metrics associated with the data items and identifying characteristic values in respect thereof, and a process selection means, said process selection means comprising means for deriving a collective value from characteristic values associated with a plurality of the data items, means for comparing characteristic values associated with a plurality of the data items with a predetermined target value, means for subjecting data items in respect of which the characteristic values are on a first side of the predetermined target value to a first process, means for selecting at least some of the data items in respect of which the characteristic values are on a second side of the predetermined target value, and means for subjecting the selected data items to a second process which is different from the first process.

56 Claims, 8 Drawing Sheets

| + | 0 - 3 | 4 - 7 | 8 - 15 | 16-18 | 19 - 31 |
|---|---|---|---|---|---|
| 0 | Version | Header Length | Type of Service (now DiffServ and ECN) | Total Length | |
| 32 | Identification | | | Flags | Fragment Offset |
| 64 | Time to Live | | Protocol | Header Checksum | |
| 96 | Source Address | | | | |
| 128 | Destination Address | | | | |
| 160 | Options | | | | |
| 192 | Data | | | | |

Header Format according to IPv4

Figure 1

PROCESSING OF DATA IN NETWORKS

This application is the US national phase of international application PCT/GB2005/001737 filed 9 May 2005, which designated the U.S. and claims benefit of GB 0410254.7, dated 7 May 2004, the entire content of which is hereby incorporated by reference.

TECHNICAL FIELD

The present invention relates to networks, for example data networks such as the Internet. It relates to ad hoc networks and to fixed networks, to networks which may be parts of other larger networks, to bounded networks such as an intranet, and to unbounded networks such as the Internet. It relates to networks for conveying information or other resources which may be in digital or analogue form, and which may be in packet or non-packet form. More specifically, aspects of the present invention relate to nodes in networks, and to methods and systems which allow nodes in a network to receive items such as data items and to forward them in certain circumstances, but to take alternative action in relation to certain items in other circumstances. Such methods and systems have applications in relation to the routing of data and other items through networks, and in relation to charging, priority, quality of service (QoS) and congestion issues for users of networks, but are of particular applicability in relation to allowing nodes to police the network and to take appropriate action in response to improper, unfair, dishonest or selfish behaviour by users of the network.

BACKGROUND TO THE INVENTION

Data in a network such as the Internet is generally sent from a source to a destination in blocks which are usually referred to as packets or datagrams, these terms generally being used interchangeably. In order to allow communication, via the Internet, between source points and destination points irrespective of whether or not they have previously communicated, a protocol known as an Internet Protocol (IP) is used. This is a data-oriented protocol used by source and destination hosts, or servers, for communicating data across a packet-switched network in order to ensure that no specific set-up process is needed before a host acting for a source tries to send packets to a host acting for the intended destination or destinations, irrespective of whether or not they have previously communicated, and irrespective of the type of data that is being communicated. Internet Protocol is a protocol relating to how certain types of information may be included in a specific manner in a "header" associated with the packets. It precedes the data in the packets, and allows them to be routed from source to the correct destination via the Internet.

Internet Protocol Headers

With reference to FIG. 1, headers associated with datagrams according to the current version of the Internet Protocol, known as IPv4, comprise a first 4-bit field indicating this version. The second field is a 4-bit "Internet Header Length" (IHL) field indicating the number of 32-bit words in the IPv4 header. The following 8 bits have been allocated to a "Differentiated Services" field containing the 6 bit Differentiated Services Code Point (DSCP) and the 2 bit "ECN" (Explicit Congestion Notification) field. The DSCP allows it to be specified how the datagram should be handled as it makes its way through the network (i.e. low delay, high priority etc.). The ECN field is set probabilistically at a congested resource so that, over a series of packets, the destination can infer the level of congestion of the path traversed. The next 16-bit IPv4 field defines the entire datagram size, including header and data, in 8-bit bytes. The minimum-length datagram is 20 bytes and the maximum is 65535.

The next field is a 16-bit "Identification" field. This field has primarily been used for unique identification of fragments of an original IP datagram. It has been suggested that this field could be used for other purposes, such as for adding packet-tracing information to datagrams. A 3-bit "Flags" field follows which is used to control or identify fragments. This is followed by a 13-bit "Fragment Offset Field" which allows a receiver to determine the position of a particular fragment in the original IP datagram.

The next field is an 8-bit "Time-To-Live" (TTL) field, which aims to prevent datagrams from persisting (e.g. going around in loops) within a network. Historically the TTL field limited a datagram's lifetime in seconds, but it has come to be a "hop count" field, with some attempt to maintain the original meaning by hops across large distances making themselves appear as multiple hops. The value may initially set at 255. Each packet switch (or router) that the datagram crosses decrements the TTL field by one (or maybe more at interfaces to long distance links). If the TTL field hits zero before reaching its intended destination, the packet is no longer forwarded by a packet switch and is thus discarded.

An 8-bit Protocol field follows. This field defines the next protocol used in the data portion of the IP datagram. The Internet Assigned Numbers Authority maintains a list of Protocol numbers. Common protocols include ICMP, TCP and UDP.

The following field in an IPv4 datagram header is a 16-bit "Checksum" field. Some values in a IPv4 datagram header may change at each packet switch hop, so the checksum may need to be adjusted on its way through a network. The checksum is followed by 32-bit "Source Address" and a 32-bit "Destination Address" fields respectively.

Additional header fields (called "Options") may follow the destination address field, but these are not often used.

Reliability in a Network

It should be noted that the Internet Protocol itself does not provide or guarantee a reliable datagram service, but a "best effort" service—it makes almost no guarantee that packets will reach their destination. Packets may arrive damaged, out of order, duplicated, or may be dropped entirely. In order to provide reliability in a network, there may also be a "Transport" layer. This is responsible for end-to-end error recovery and flow control, and aims to ensure complete data transfer, although this again cannot be guaranteed for any of a variety of reasons relating to capacity, infrastructure problems, abuse etc. In the IP protocol Stack this function is achieved by the connection oriented Transmission Control Protocol (TCP). Alternatively a basic datagram service can be provided by the User Datagram Protocol (UDP).

Routing in a Network

Between source points and destination points in a network, there are generally multiple intermediate points, some of which may be active, in the sense that they may take a role in the decision-making regarding the route by which data they receive is forwarded on towards the destination. In the context of the Internet, these may be known as packet switches, or Internet routers. Other intermediate points may be passive, in the sense that they take no part in this decision-making—data may simply pass via them on its way through the network. Intermediate points that are "active" in the above sense may look at information in or associated with the data, in particular the destination address, in order to determine the subsequent path, or at least the next leg of the path, that the data should take in order to proceed towards its destination. In addition to such decision-making in respect of a specific item of data, intermediate points may communicate continuously with each other in order to share information about network conditions. Typically this information concerns the number of hops to each destination network and may include other information such as policies concerning whether one network wishes to offer routing transit to another. Intermediate points may also continuously share information about more pathological network conditions, such as infrastructure problems, congestion levels and delays occurring at different areas within the network. It should be noted that "areas" in the context of a network need not be areas in the geographical, or even the sense of a physically interconnected set of nodes—they may be areas of connectivity in a virtual network overlaid on the real physical links, which simply have a function to perform or a service to provide, much as the Internet is a network of virtual links overlaid on lower layer physical links.

Routing decisions may be taken in order to balance the load across different areas of a network, or to route data around a problem area. In addition to this, if the network is being run on a commercial basis, with charges being made for services provided, routing decisions may be taken in order to find the cheapest, fastest, or most reliable route through the network. In relation to this, various schemes, such as "congestion charging" schemes, operate or have been proposed for determining how such charges could or should be levied, but there are significant problems in setting up a system which is workable and fair, not least because for a data packet to leave a sender and reach its destination, it may need to pass through parts of one or more networks which may be of a variety of different types (i.e. fixed, ad hoc etc.). These may extend through several different countries or via satellites, be under the control of different entities, or conform to a variety of different sets of rules, both technical and legal. For a charging scheme to operate successfully in such circumstances, it may need to be able to operate irrespective of levels of trust between entities, and may need to be resistant to abuse or dishonest behaviour by any entities involved.

A recent example of a routing algorithm that claims to attempt to optimise throughput of a network by taking account of node metrics indicative of congestion levels is disclosed in United States patent application US2003/0128687 ("Worfolk et al), but this does not take any account of possible abuse or dishonesty by parties who may or may not trust one another.

Charging Schemes in a Network

Charging schemes based on the Explicit Congestion Notification (ECN) field have been proposed. If the ECN capability is enabled by the sender (after negotiation with the receiver) the 2-bit ECN field is initialised to a binary value of either 01 or 10 (which are considered equivalent for the purposes of congestion control). The ECN field may be set to binary 11 (congestion experienced—CE) by any router through which a data packet passes, depending probabilistically on the levels of congestion currently being experienced by that router. When the data reaches its destination, the relative proportion of packets set to CE may provide an indication to the receiver of the overall level of congestion on the path by which the data passed through the network. This may be interpreted as a "cost" associated with the delivery of data via that particular path, which may be allocated to the receiving entity, the sending entity, or one or more other entities. Irrespective of whether any entity truly pays any consideration, the information available to the receiver may be of use in allowing routing decisions to be taken. It will be noted however that for any other entity to take any action or decision based on the final value, they generally need to be able to rely on the receiving entity to have passed on correct information.

In the literature that is supportive of using congestion charging of the above type, the problem of only the receiver being able to pay congestion charges or rely directly on information based on Explicit Congestion Notification data has generally been dismissed by arguing that arrangements between sender and receiver are a separate problem. This problem has been used as an argument against congestion charging, but no attempts at solving this problem are apparent in the literature.

Co-Pending Un-Published UK Patent Applications

Co-pending UK patent applications GB 0407144 (filed 30 Mar. 2004 and having Agent's Ref. A30432) and GB 0407381 (filed 31 Mar. 2004 and having Agent's Ref. A30499), both of which are unpublished at the time of filing of the present application, relate to data networks, and to nodes making up parts of data networks, arranged to derive information relating to the characterisation of paths taken by data travelling between nodes in the networks. Path characterisation information is fed back from a receiver of data to a provider of data, and allows nodes subsequently forwarding data to be informed of characteristics of the downstream path. The applications also relate to routing nodes and methods for using such path characterisation information to make informed routing decisions when forwarding data in a data network. The content of these two applications is incorporated herein by reference.

The insight that measures of characteristics of the downstream path can be used as a "shadow price" is discussed in the above un-published co-pending UK patent applications, and is of relevance to the reason why embodiments of the inventions to which those applications relate are capable of providing solutions to various problems relating to path characterisation, routing and congestion control. A "shadow price" can be thought of as a proxy for a market price. Within its environment or system, it can be regarded as and used as an actual price, even though it may not have any actual commercial status outside that environment or system. A brief summary of the concept behind the subject matter of these applications is given below.

The sender in a network such as datagram network can be thought of as being active, whereas the receiver may be passive, in the following sense. A node capable of sending items may be able to control what it sends, where it tries to send them, and how often it sends them, but it has very little control over what, from where or how often it receives items. On the other hand, a sender is generally in the worst natural position to know about the network it is sending items into, while a node receiving items may at least have the benefit of being able to receive information characterising the path taken by arriving items (path congestion, hops traversed etc). In this regard, the sender can be thought of as having control without knowledge, whereas the receiver has knowledge without control. There is thus a benefit in a receiver providing feedback to the sender in respect of the path knowledge it learns, in order to carry path knowledge to where the control is. This is how the Internet currently works. Herein lie two problems:

(i) if the receiver has no incentive to feed back the information, and to feed it back honestly, it may well not do so;

(ii) intermediate nodes are both receivers and senders (in the sense that forwarding is simply sending something that has been received), but end to end feedback only conveys path knowledge to the first sender on the path, and does not convey path knowledge to every intermediate sender. Although the Internet is based on the endto-end principle, where intermediate nodes are not expected to exercise intelligent control, they are often expected to make intelligent forwarding decisions based on routing information, which essentially should comprise knowledge of the downstream path. They may also be expected to make decisions on the rate at which they forward different classes of data, which would also ideally be informed by downstream path knowledge.

The two afore-mentioned un-published co-pending UK patent applications disclose solutions, amongst others, to one or both of two general problems, which can be regarded as separate but related. These problems can be summarised as follows:

1) How to arrange for the provision of information to nodes characterising the downstream path from those node; and
2) How to proof this information from falsification.

Embodiments disclosed in those applications allow the following to be achieved:

1) Provision of path characterisation information to nodes in a network, said information relating to any of a variety of possible characteristics of the path or paths downstream of the node in question. To achieve this, there may be no need for upstream traffic beyond that being fed back end-to-end from a destination of data to the appropriate source. This is particularly useful where routes are asymmetric, particularly where it is not possible to send data upstream over certain unidirectional links (e.g. satellite links). But it is also useful if the available capacity can be increased by removing the overhead of routing information.
2) Ensuring that information such as the above may be proofed against falsification for the gain of an individual controlling any intermediate or end node.

Reacting to Congestion in a Network

In certain circumstances, when a node in a network becomes congested or overloaded, there may be a need for it to drop some packets, or forward some packets with a lower priority than others, or otherwise to subject some packets to a process that is more beneficial to the sender and/or receiver than that to which other packets are subjected. Various schemes have been proposed or are being used which allow nodes in a network to drop packets in such circumstances.

The main ways in which available capacity of routers, nodes, or other types of network resources can be shared among users or flows can be summarised according to the following four types: fairly, differentiated, by reservation admission and by dynamic willingness to pay. Outstanding problems exist in relation to each of these when tackled under current approaches, as will be outlined below.

Fairness: If a router is arbitrating service by only considering rate fairness locally, it will not be able to allow for flows that are constrained by downstream congestion. So schemes that penalise the highest rate flows cannot discriminate between real misbehaviour and flows which would genuinely be allocated a high rate because slower flows cannot make use of any more capacity. And schemes that maximise the minimum rate do not optimise network fill because they are not taking into account downstream congestion. Indeed, recent research suggests that max-min fairness can lead to pathologically poor allocations in some asymmetric cases. Or in other words, given proportional fairness has been proven to optimise welfare, anything else must be less optimal. But proportional fairness requires knowledge of downstream path congestion. In TCP congestion control, senders rely on congestion feedback (drop or ECN) to equalise the products of bandwidth, delay and the square root of path congestion.

Attempts by the network to police TCP fairness are currently hobbled by lack of visibility of the last two parameters, so they tend to merely police rate fairness, leading to false positives and missed negatives. As explained above, embodiments of the un-published co-pending UK patent applications incentivise end systems to report these parameters truthfully into each network path.

Differentiated service: Moving on to differentiated (i.e. unfair) service, the general aim is to 'colour' traffic to allow any forwarding resource to understand how it should prioritise traffic in the event it becomes congested, thus unequally sharing the delay and loss effects. Priority colouring is generally assigned based on some policy. Some customers want differentiated service, but they cannot say precisely how differentiated it should be, only expecting a marked improvement. Other customers expect operators to offer an assurance, albeit statistical, that the effects of congestion will be avoided for certain of their traffic. Of course, a network cannot offer open-ended assurances for any level of applied load or for any distribution of that load across network destinations; customers who want assurances must have some idea of the traffic profile they would like assured. Differentiated services solutions aim to improve on earlier techniques which partition capacity for each customer's requirements at every resource. They handle traffic in classes, rather than more costly per-customer virtual circuits.

Bandwidth reservation: Just as shadow pricing has been used across core networks to synthesise differentiated service at the edge, it can also be used to synthesise connection admission control. The admission control may be determined on end systems or at the network edge. Congestion may be metered at the egress of a ring of gateways, thereby controlling session admission into a potentially Internet-wide edge-to-edge hop. However a congestion report needs to be fed back across one large RSVP hop. This effectively creates a feedback channel to an upstream router using only standard Internet signalling protocols.

Retail congestion pricing: All the above uses of shadow pricing convert it into a dynamic service penalty, whether reduced rate, reduced priority, or increased blocking probability. The original formulation of shadow pricing was, however, largely framed around the idea that customers would be charged dynamic prices, which they would handle with a policy-driven software agent. It has been argued that the service models that network operators choose to offer will always support current applications, whereas congestion pricing in the retail market will allow new applications with new QoS requirements to evolve. Despite general aversion to the unpredictability of congestion pricing, there is still scope for pure retail congestion pricing, particularly targeted at machine mediated applications like peer-to-peer file-sharing, remote data back-up, etc., as well as at corporate users (e.g. content delivery network operators) more interested in cost saving, than short-run predictability. All the more recent congestion pricing schemes have proposed the ECN mark as the shadow price.

If the sender is to be exposed to congestion charges based on standard ECN, the sender's network operator would not reliably be able to meter end-to-end congestion feedback. The receiver's network operator would have adopt a scheme such as metering accumulated path congestion notification then transfer charging the sender (variants of this charging model exist but none solve the problem). Without a global solution to source spoofing, an unavoidable 'denial of funds' problem results, where malicious senders can cause charges to innocent receivers. Similarly, if ECN-based congestion charging were used at network interconnect points, downstream networks would have to pay upstream networks for upstream congestion, despite having only indirect control over upstream networks' routing.

Congestion Control Incentive Mechanisms

Without incentives, congestion control contains inherent 'free-rider' problems. The rules for fair resource allocation during congestion don't match what every end user would do if given free choice to act in their own self-interest. Network providers may also have incentives to cheat given that they are generally in competition with each other, and that they would like their customers to pay more for less wherever possible.

Two main types of self-interest can be identified:

Users wanting to transmit data between themselves across the network as fast as possible and pay as little as possible for the privilege. In this respect, there is no distinction between senders and receivers;

Network operators wanting to maximise the revenues they extract from the resources they choose to invest in. They have to compete amongst themselves for the custom of end systems.

An aim of certain embodiments of the present invention is to allow nodes in a network to use characterisation information received with or in respect of data items, for example path characterisation information of the type referred to above in relation to the un-published co-pending UK patent applications, in order to subject some data items to a process other than the normal process to which data items are subjected by that node. More particularly, certain embodiments of the invention allow nodes, such as routers in the network, to identify items such as data packets whose associated characterisation information has been assigned, changed, or otherwise set in such a way as to gain an unfair advantage. Such items can be thought of as having been received from 'misbehaving flows'.

SUMMARY OF THE INVENTION

According to the present invention, there is provided a processing node for processing data items in a data network, said data items having characterisation metrics associated therewith; said processing node comprising:

means for receiving data items;

means for receiving characterisation metrics associated with said data items, and identifying characteristic values in respect thereof; and a process selection means, said process selection means comprising:

deriving means for deriving a collective value from characteristic values associated with a plurality of said data items;

comparing means for comparing characteristic values associated with a plurality of said data items with a predetermined target value;

means for subjecting data items in respect of which the characteristic values are on a first side of said predetermined target value to a first process;

selecting means for selecting, according to a predetermined selecting function dependent on said collective value, at least some of said data items in respect of which the characteristic values are on a second side of said predetermined target value; and means for subjecting the selected data items to a second process, said second process being different from said first process.

Corresponding to this, there is also provided a method for processing data items in a data network, said data items having characterisation metrics associated therewith; said method comprising the steps of:

receiving data items;

receiving characterisation metrics associated with said data items, and identifying characteristic values in respect thereof; and a process selection step, said process selection step comprising the steps of:

deriving a collective value from characteristic values associated with a plurality of said data items;

comparing characteristic values associated with a plurality of said data items with a predetermined target value;

subjecting data items in respect of which the characteristic values are on a first side of said predetermined target value to a first process;

selecting, according to a predetermined selecting function dependent on said collective value, at least some of said data items in respect of which the characteristic values are on a second side of said predetermined target value; and subjecting the selected data items to a second process, said second process being different from said first process.

As will later be understood, in some embodiments of the invention, references to characteristic values being on a "first side" of the predetermined target value or of the collective value may relate to characteristic values being "above" the respective values, whereas characteristic values being on a "second side" may relate to characteristic values being "below" the respective values. In alternative embodiments, however, the relative "directions" of the "first" and "second" sides may be reversed, particularly in view of the fact that characteristic values, whose start points may be above or below their respective target values, may therefore rise or fall towards their respective targets or thresholds (which themselves may be chosen to be positive, negative, or zero).

In relation to the characterisation metrics associated with the data items, it will be noted that these metrics may be values themselves, in which case the step of identifying characteristic values in respect thereof may simply involve using, or deciding to use, the metrics. The characterisation metrics may however comprise, or be included in, items such as internet headers, for example, in which case it may be necessary to extract or derive characteristic values from them. The characterisation metrics need not be numerical at all—in such cases, the step of identifying characteristic values in respect thereof may involve assigning a numerical value to a physical property.

BRIEF DESCRIPTION OF THE DRAWINGS

FIG. 1 is a table showing fields in the headers associated with data according to the current version of the Internet Protocol, IPv4;

FIGS. 5, 6 and 7 are graphs indicating the use of and effects of using dropping algorithms, in which:

FIG. 5 is a graph showing the likely effect of cheating on the downstream path shadow price (DPSP) probability distribution;

FIG. 6 is a graph showing how misbehaviour can be penalised with uncertainty;

FIG. 7 is a graph indicative of the dependence of a penalty function on recent history.

DESCRIPTION OF THE EMBODIMENTS

Figure 2:
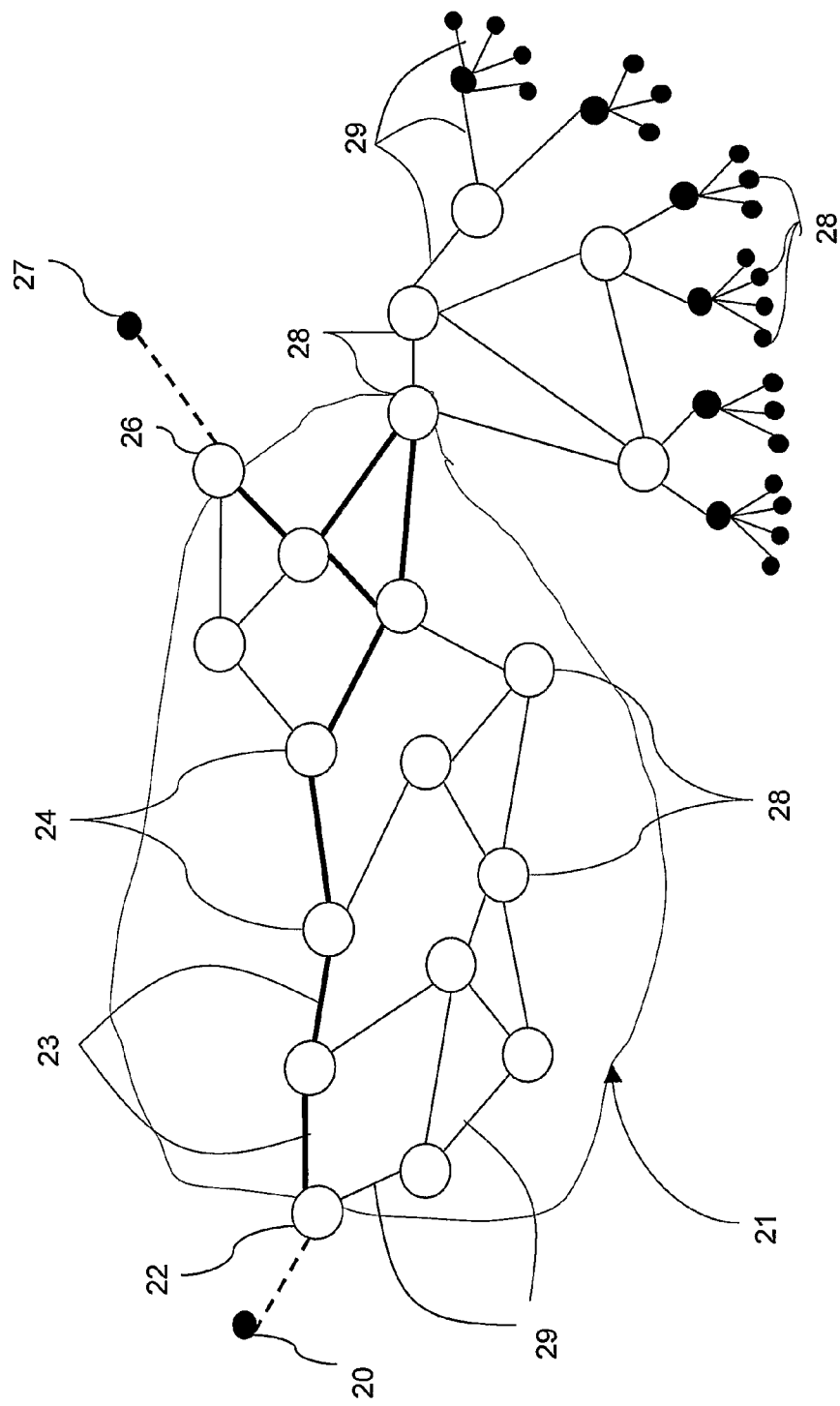
FIG. 2 is a topological representation showing pertinent features of a network.

With reference to FIG. 2, there is shown a topological representation of certain features of a network, such as a data network. This figure will be referred to in order to describe an exemplary network 21 in which a node according to an embodiment of the invention may act, but it should be noted that embodiments of the invention are applicable in relation to a variety of different categories of network, such as fixed, mobile, ad hoc, and other types, and to networks themselves containing a variety of different categories of communication channels. As shown in FIG. 2, the network 21 may in fact be a sub-part of a wider network such as the Internet itself. The network 21 comprises a plurality of nodes 22, 24, 26, 28 each of which may serve to fulfil one or more of the following roles in relation to a particular attempt to communicate data from one location to another: providing data, forwarding data, and receiving data; or they may not be involved. At different times, or concurrently but in relation to different attempts to communicate data, or in relation to attempts to communicate data between alternative locations, nodes may of course take different roles. There may thus be no difference between the different types of node other than their function at a particular time. For the purposes of explaining the forwarding of a data item along a path, however, the network 21 will be described in terms of comprising a provider node 22, a receiver node 26, and at least one intermediate node 24.

The provider node 22 and the receiver node 26 need not be the original source of the data item or its eventual destination. In this case, the originating source of the data item is shown to be at node 20 which is outside the network 21, and the intended eventual destination of the data item is shown as being at node 27, also outside the network 21. Possible distinguishing features of a provider node and a receiver node may relate to the fact that a receiver node may send feedback to a provider node which includes path characterisation information, in which case path characterisation information may be derived and provided to nodes in a network in the manner described in the two afore-mentioned co-pending UK patent applications. As will be explained later, such path characterisation information is of particular relevance to embodiments of the present invention, but they need not be limited in this regard.

In between nodes are individual communication channels 23, 29 via which data items can be communicated. Channels which link nodes which take a role in communicating data from the provider node 22 to the receiver node 26 may be referred to as hops 23. Between the provider node 22 and the receiver node 26, a variety of alternative paths may be taken, in which case other ones of the communication channels 23, 29 would be regarded as hops 23 on the path.

In the IPv4 header, two fields are used to characterise the path, the TTL and the ECN fields (certain options such as a "timestamp" option were also designed for this purpose). A protocol that aims to characterise the path against hop count and congestion metrics may require modifications to the standards for handling IP headers. Therefore the IP version field might be set to some future version, say eight. Prior to describe an embodiment of the invention, we will describe a new "Explicit Congestion Level" (ECL) field consisting of an 8 bit real number replacing the two bit ECN field (how this fits into the header need not concern us here). The TTL field could remain the same size, but both TTL and ECN fields will be used differently from their standardised semantics in IPv4. As will be understood from the explanation below, such an ECL field will be capable of providing path characterisation information to any node, such path characterisation information providing information from upstream of the node in question which is indicative of the amount of congestion likely to be experienced on a path downstream of the node in question by a data packet at the node in question. As will be understood, such an ECL field is an ideal metric for use in relation to a preferred embodiment of the present invention.

Explicit Congestion Level (ECL)

Figure 3:
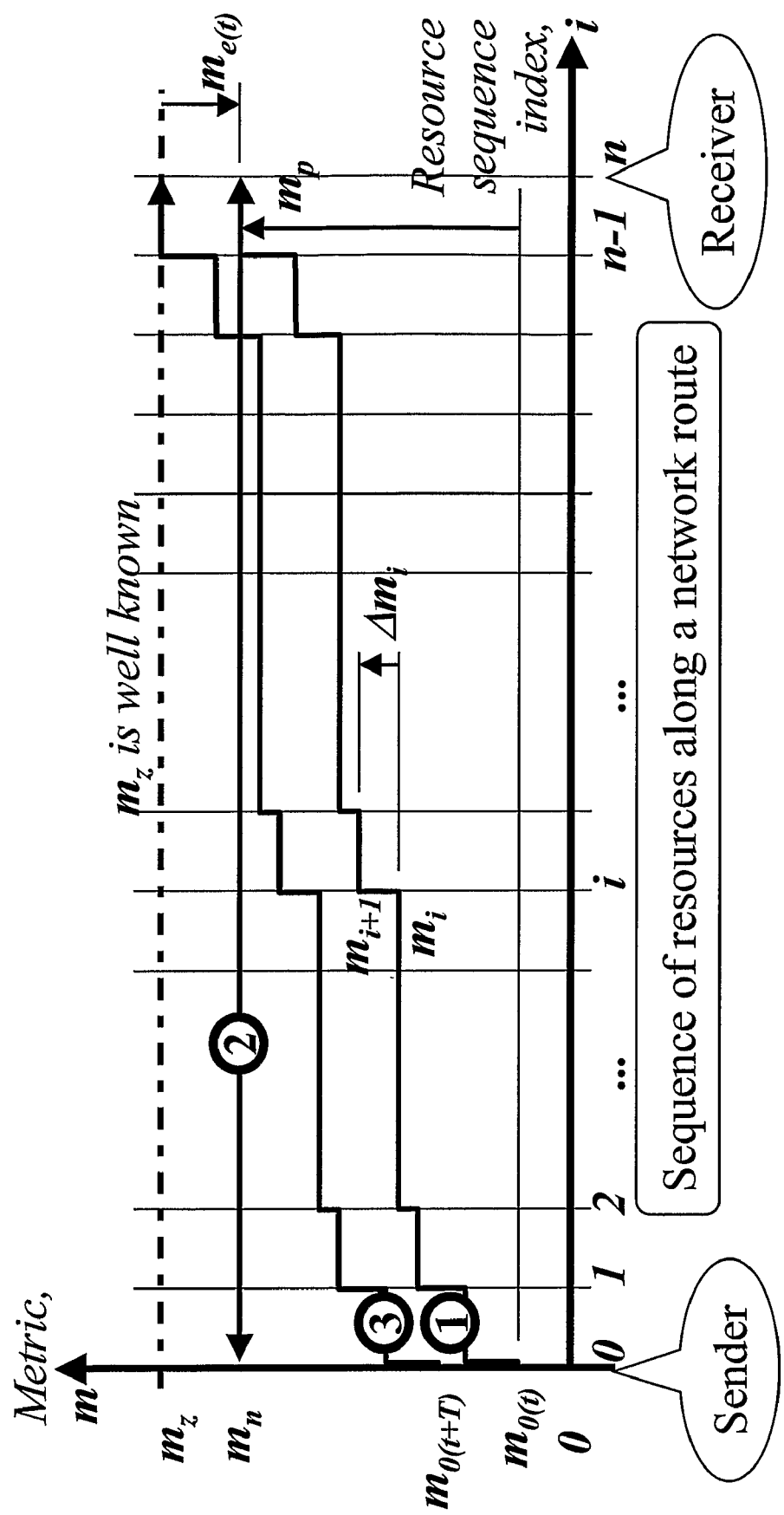
FIG. 3 is a graph illustrating the use of a path characterisation metric based on an Explicit Congestion Level (ECL)
Figure 4:
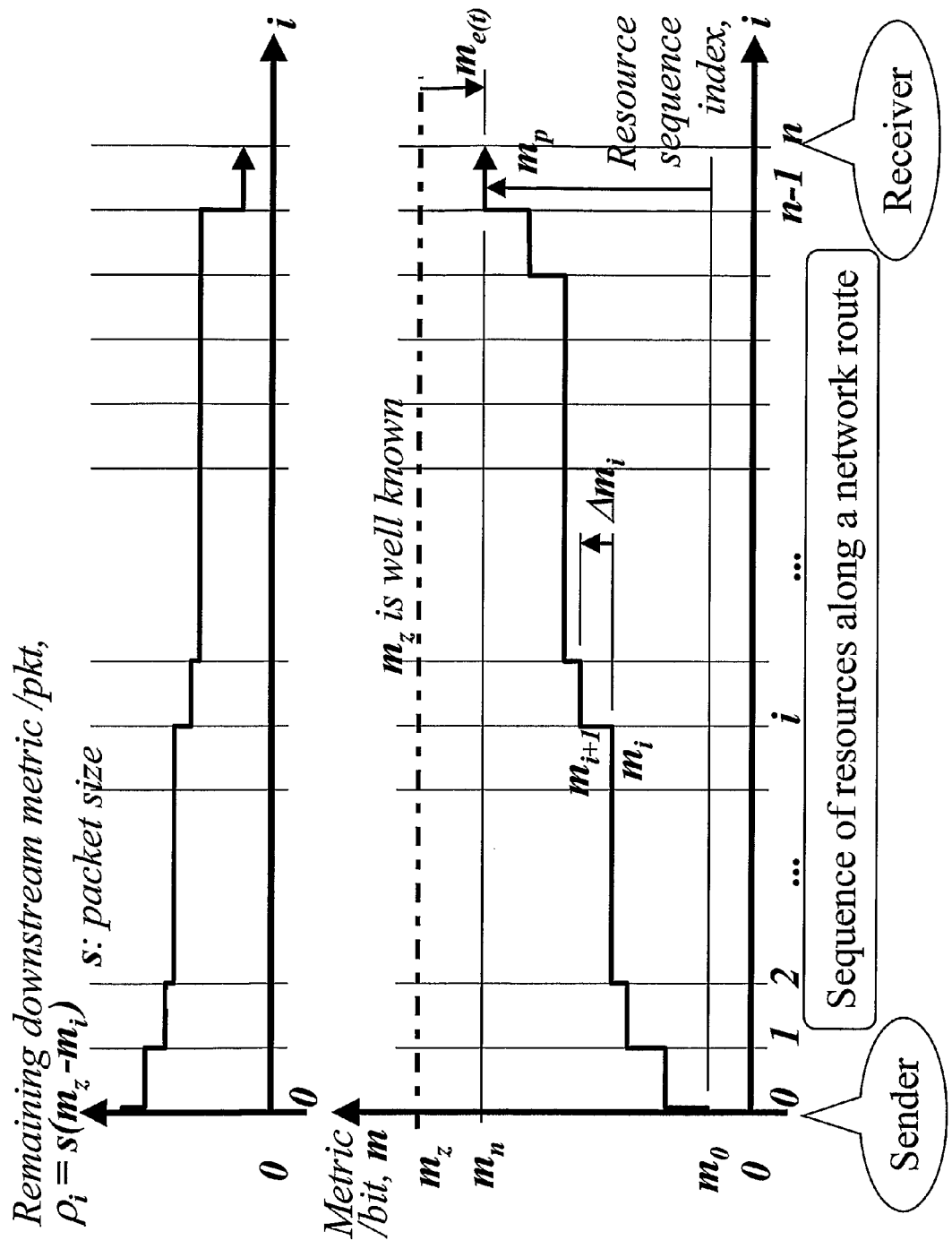
FIG. 4 is a graph illustrating the mapping from ECL to a downstream shadow price.

With reference to FIGS. 3 and 4, we propose the following definitions of congestion level experienced by a certain packet. Consider a path across a network consisting of a sequence of resources, i; where $0 \leq i < n$:

1) The change in congestion, $\Delta E(X_i=1)$, caused by a packet at single resource i is the increase in expectation that the event $X_i$ will occur, if the packet in question is added to the load, given any pre-existing differential treatment of packets, where $X_i$ is the event that any packet will not be served to its requirements by resource i.

2) The change in path congestion level, $\Delta E(X=1)$, caused by a packet traversing the path is the increase in expectation that the event $X_i$ will occur if the packet in question is added to the load traversing the entire path, given any pre-existing differential treatment of packets, where X is the event that any packet sharing any resource along the sequence of resources used by the packet in question will not be served to its requirements.

A metric, m, can be placed in a notional Explicit Congestion Level (ECL) field in the network layer header of all data packets, to allow nodes on the path to estimate their downstream path congestion level. $m_i$ is the value of the field before processing at the $i^{th}$ resource. The locally determined increase in congestion level at the $i^{th}$ resource is $\Delta m_i = \Delta E(X_i=1)$, which is added to the level of the metric in the packet, because that packet caused that increase in local congestion. So, $m_{i+1} = m_i + \Delta m_i$. It will be noted that $\Delta m_i$ is a function of the load at the $i^{th}$ resource. An approximation to this function is given by the RED ("Random Early Detection") algorithm.

A resource is any congestible aspect of a system, for example link capacity, processing capability, spectrum capacity or power capacity. Nodes can run processes that characterise the congestion of (possibly multiple) resources for which they are responsible. Congestion of some resources (e.g. links) depends on bit load, while congestion of others (e.g. route look-up processing) depends packet load. To allow for both types of congestion, two fields may be included in each packet. In this ECL example we focus on just the per bit type of congestion. So the metric in our ECL field should be considered to apply to each bit in a packet.

The subject matter of the un-published co-pending UK patent applications relating to the derivation of an ECL path characterisation metric will now be summarised in more detail.

Consider the first of a flow of packets (step (1) in FIG. 3). The sender should estimate an initial value of ECL, $m_0$, to place in the packet header, and store this value. After transmission over the path, the ECL on leaving the $(n-1)^{th}$ and last resource (there is no $n^{th}$ resource) will be:

$$m_n = m_0 - \sum_{i=0}^{n-1} \Delta m_i$$

The receiver then feeds back $m_n$ to the sender using a relevant end to end protocol above the network layer (step (2)). When this feedback arrives at the sender, it can infer the exact path congestion level:

$$m_p = \sum_{i=0}^{n-1} \Delta m_i \qquad \text{(Equation 1)}$$
$$= m_n - m_0$$

The sender may now adjust the rate at which it sends subsequent packets according to a congestion control algorithm. We arrange for a reference value of the congestion level, $m_z$, to be well known (standardised) as the target congestion level to be aimed for by the time a packet reaches its destination. The sender calculates the 'error' $m_e = m_z - m_n$ and adjusts its estimate of the initial ECL to use for the next packet to send over this path to:

$$m_{0(t+T)} = m_{0(t)} - m_{e(t)},$$

in an attempt to ensure that the ECL tends to reach $m_z$ on arrival at the destination (step (3)).

For this next packet and all subsequent packets, if the path congestion $m_p$ remains unchanged, $m_n = m_z$. However, if the path congestion changes, $m_0$ will reflect the change within one round trip, in order to ensure that the ECL field still tends to $m_z$ at the destination. This simple change goes a considerable way to achieving an initial objective of such path characterisation: given $m_z$ is constant, values of $m_i$ at any point on any path give a measure of congestion downstream of that point, $m_z - m_i$, albeit a round trip ago and further modulated by any changes on the upstream path just traversed by the packet.

We shall occasionally use the notation $m_{zi} = m_z - m_i$ to denote remaining per bit downstream congestion at node i as discovered on the previous round trip. Generally, we will use:

$$\rho_i = s(m_z - m_i) \qquad \text{(Equation 2)}$$

to denote per packet downstream congestion (see FIG. 4), where s is the packet size in bits. From our earlier definitions, $\rho_i$ represents a packet's "downstream path shadow price" (DPSP) determined from the previous round trip.

Use of Shadow Pricing in Networks

As explained in "Rate control for communication networks: shadow prices, proportional fairness and stability" (Frank P. Kelly, Aman K. Maulloo, and David K. H. Tan, Journal of the Operational Research Society, 49(3):237-252, 1998), path shadow pricing can provide the correct incentives for rational users and networks to respond correctly to any pattern of resource congestion. The explicit congestion notification (ECN) mechanism employed was also simple, elegant and already in the process of standardisation. The optimisation of the whole system was divided into user and network parts. Users were charged the sum of the shadow prices of congestion experienced at resources along the path they were using (by applying a charge to ECN markings emerging at the receiver). It was assumed that users knew the utility they derived as a function of the data rate at which they were served by the network. An important assumption being that utility was increasing and differentiable, with its derivative strictly decreasing. User agents would then continuously alter their data rate towards the point where the difference between their utility and the congestion charge was maximised. Networks would alter the rate of congestion marking at a resource dependent on its total load. The bulk data traversing the resource would be marked at this rate, which is possible without per flow state. With each party acting selfishly and solely on local information, it was shown that the proposed mechanism would lead to behaviour that maximised social welfare.

Use of ECN as the mechanism presented new incentive problems however:

It was assumed that receivers would pay congestion charges on behalf of senders, and somehow they would arrange for senders to settle these charges out of band. However, an incentive has to be created to get senders to settle with receivers for the charges they cause. This would require strong binding of the sender's financial identity with the network address shown as the source in data packets. A further pre-requisite would be an international web of contractual commitments between otherwise unrelated network providers to ensure senders or their ISPs anywhere in the world were liable for costs incurred by receivers. Even then it would still be costly to recover money from defaulting remote users through international courts. In other words, this is not a practical proposition.

It also had to be assumed that downstream networks would pay for the level of ECN sent into them by upstream networks. Therefore a routing incentive would have to be created for network "A" upstream of resources "B" & "C" to send traffic to "D" through the least congested of B and C. As it stood network D had to pay for the consequences of A's decision. Further D would have to pay for the consequences of the routing decisions of all networks upstream of A.

In fact, both problems are facets of the same underlying problem. Downstream parties had to pay for the consequences of decisions made upstream, then somehow recover the costs after the event. The system now to be described aims to keep the useful properties of Kelly's original analysis but re-aligns the ECN mechanisms, allowing the direction of payments to follow the direction of the data. So costs are recovered as they are incurred, not afterwards.

In this system, a suitable metric, such as, in this example, the downstream path shadow price (DPSP), is included with the data, for example in an ECL field as described earlier. This is notionally in order to 'pay' for the passage of the data item through the network. But, having made this step, payment need not involve money. The shadow price that data carries must be 'paid' for, for example by reduction of the service it enjoys, or by paying actual money not to have its service reduced.

To be concrete but without loss of generality, for the rest of this discussion we assume that network operators pay actual money for the shadow price they forward downstream, while data senders 'pay' either in money or in service reduction. It is believed that this is a realistic and practical assumption.

In this initial scenario, each resource i will levy a shadow charge $$c_i = \lambda_i \rho_i \qquad \text{(Equation 3)}$$

per packet on its upstream node, where $\lambda_i$ is the offered price per DPSP per bit set at resource i. Of course, the sender has no upstream node to charge, and the receiver cannot expect to charge its upstream network (explained below). For now, we assume that all resources charge the same price, so $\forall i \, (\lambda_i = \lambda)$. So $c_i = \lambda \rho_i$, which we shall term the 'homogeneous congestion pricing' assumption. Then, any service reduction to replace this shadow charge should reduce the value of the service by an equivalent amount.

Of course, any sub-sequence of the resources may all be within a single domain of control, in which case there is obviously no need for each to actually charge the next. Instead just applying the above tariff at each domain boundary will achieve the same result, because ECL is cumulative. Also note that, although this is a per packet charge, it is extremely efficient to meter in bulk, even at high capacity interconnect points.

By expecting data to carry its DPSP with it (in the ECL field), we effectively ask every intermediate party on the path to take responsibility for the information they pass on about the downstream path (by paying for it), subtracting the gain they want to make from it as it passes. If any intermediate node wants to gain by subtracting more than their fair share, they can. But they run the risk of losing all their revenue to any other network with a route to the same destination, if it can advertise at a lower price. Thus, as long as there is sufficient competition for each route, traffic will tend to be forwarded through those networks that subtract their truthful shadow price. Where there is insufficient competition for a route, excess profits will be made until there is sufficient incentive for other network operators to provision competing capacity. If a network tries to attract custom by charging less than the path shadow price, more traffic will be attracted than it has the capacity to handle. It will immediately be discovered that it is dropping traffic so networks will re-route to bypass it.

The mechanism set out in the afore-mentioned un-published co-pending UK patent applications is designed to ensure that the DPSP starts with a sufficiently high value to drop to zero after having traversed this network of competing operators, whichever of the above strategies they happen to adopt. If it does not drop to zero, the sender should adjust its initial value next time round to try to ensure it does the next time. But we have to give the sender and receiver incentives to ensure this happens. We will now consider their incentives, first against understating then against overstating the initial DPSP.

Clearly, there is an incentive for the sender (and intermediate networks) to understate the level of DPSP passed on downstream, because the payment it has to make (whether money or service reduction) to its downstream provider depends on the DPSP it sets. We solve this general incentive problem by expecting no parties to pay for traffic once its DPSP has dropped below zero. In other words, a positive DPSP value implies sender pays, but a negative DPSP value implies no-one pays (not receiver pays). Then, any network can be certain that traffic with negative DPSP no longer carries any ability to pay for any further congestion it may encounter downstream. Therefore it should be dropped for example, or truncated, or otherwise degraded.

In fact, the position is complicated by continuous variability of path congestion. So although negative DPSP traffic no longer has any capacity to cover its costs, a network will want to make allowances for path variability.

A node according to an embodiment of the present invention described below with reference to FIG. 8 may make such allowances while still detecting malicious understatement of DPSP.

It has already been explained that the shadow price that data carries must notionally be 'paid' for, either by reduction of service or by payment of actual money not to have its service reduced. The data sender therefore has to pay one way or the other for the DPSP it places in packets it sends, ensuring it has no incentive to overstate it. The receiver can cause the sender to overstate the initial DPSP by sending dishonest feedback. The receiver's incentives are more ambivalent though, depending on the choice of the sender:

If the sender chooses to 'pay' by allowing service reduction, the receiver has no incentive to lie to the sender to make it overstate DPSP, because it will just suffer a slower download rate.

If, however, the sender chooses to pay to avoid service reduction with real money, the receiver has no incentive to prevent overstatement of DPSP, assuming the receiver's interests are independent of the welfare of the sender. Indeed, if the receiver wishes to harm the sender's interests, it can inflate its feedback to cause the sender to spend excessively and unnecessarily.

This last point seems to introduce an incentive incompatibility into the system. However, this is not necessarily true in this case. A sender will usually only choose to pay extra to negate congestion effects for certain flows with good reason. Typically because it has some extraneous relationship with the receiver that makes paying advantageous. If a sender chooses to pay extra to upload to just any old anonymous receiver who claims congestion on its path, the sender probably has a good reason to want to appear to have more money than sense (e.g. it wants to appear to be a high quality server, perhaps as a loss leader). If a receiver knows the sender is paying for whatever DPSP the receiver tells it to use, it may appear that the receiver will just feedback a ridiculously high DPSP error. Having traversed the path, path congestion having been subtracted, this will still leave a large balance of DPSP in the traffic, which the penultimate network operator will have to pay to the receiver. Unfortunately for the receiver, the penultimate network operator need not be that naive. It will be able to know that the DPSP should be zero on arrival at the receiver. So any contract it has with the receiver should not involve payment of congestion charges. So the receiver has no incentive to make the sender inflate, the initial DPSP by sending dishonest feedback.

Policing within a Network

As explained above, the correct incentive to react to congestion can be provided if the sender does not gain from under-declaring the initial DPSP level. An incentive against under-declaration can be introduced by penalising data items with negative DPSP values which, for brevity, we will occasionally refer to as 'negative packets'. We mean this as a quantitative qualification, so that for instance packets can be more or less negative. More generally, it will be noted that the metric need not be a positive value which drops towards zero. It may be a negative value that rises towards zero, in which case the correct incentive can be introduced by penalising data items with positive DPSP values (i.e. positive packets'), or it may rise or fall towards a non-zero target value.

However, congestion across a path and the routing of the path itself may vary with time. So it will be difficult for the sender to exactly predict each initial ECL value required, only having knowledge that is one round trip out of date. In other words, a node determining whether to penalise a packet may not be able to discriminate between a packet with maliciously understated DPSP and a packet with innocently understated DPSP, caused by it crossing a path with rising congestion. However, over time, innocent understatement should be balanced by an equal total amount of overstatement.

Figure 5:
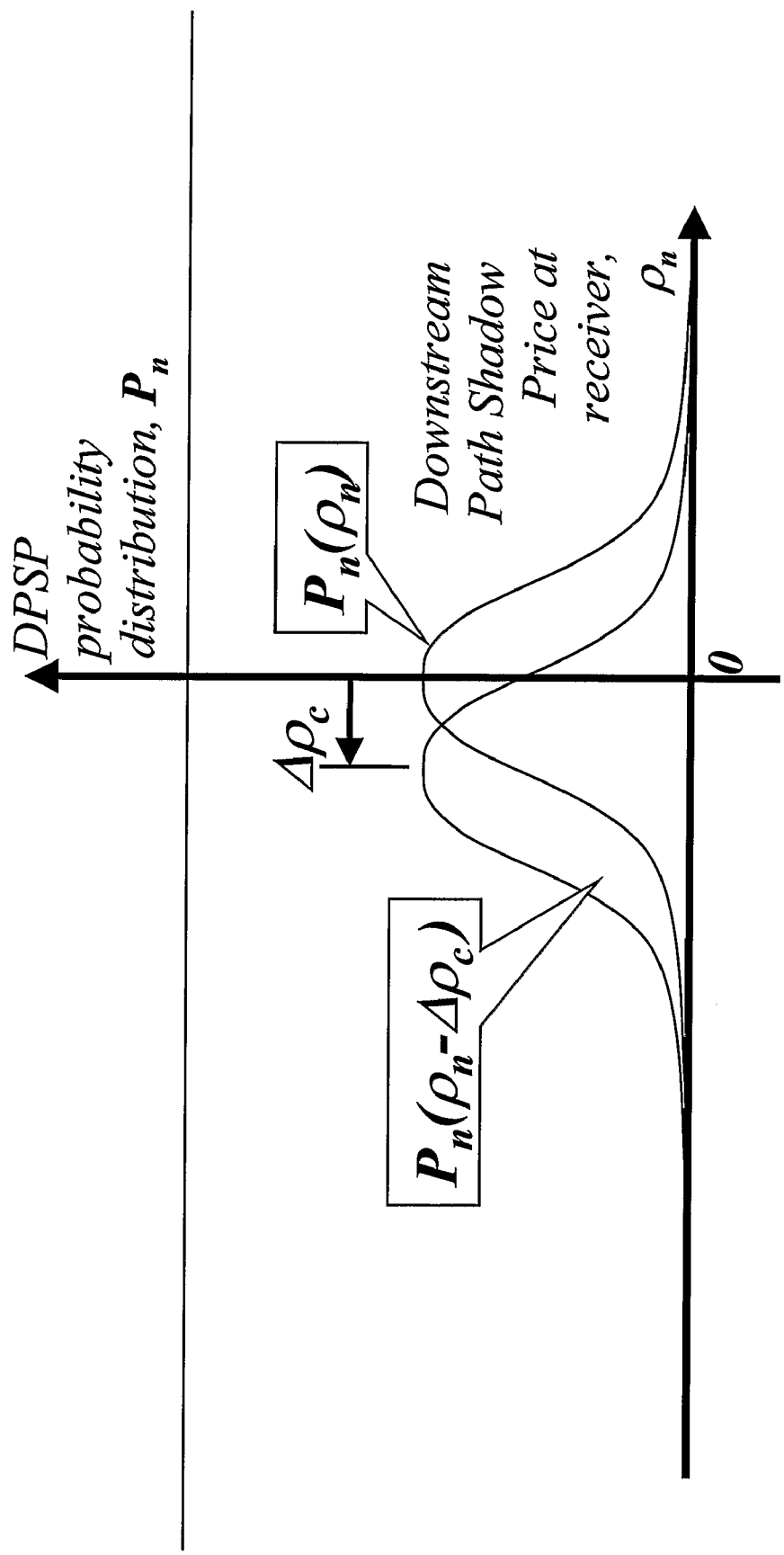

Referring now to FIG. 5, there is shown a possible probability distribution of DPSP in one packet arriving at the receiver, $P_n(\rho_n)$, which would be centred around zero for a truthful sender at the head of a path with normal congestion variation. Also shown is the same but shifted distribution $P_n(\rho_n-\Delta\rho_c)$ caused by a sender persistently under-declaring the initial DPSP of one packet by the same amount, $\Delta\rho_c$.

A naïve solution would be to apply the same 'sender pays' congestion tariff (equation 3) at the final network interface as everywhere else, except only ever applying it if a negative balance resulted at the end of an accounting period, $T_a$. That is, the charge levied by the destination on the penultimate network over an accounting period would take account of all positive and negative DPSP, but then only be applied if the result were negative. Of course the negative charge effectively reverses the direction of payment changing it to a 'receiver pays' tariff. This tariff would certainly make the receiver ensure the initial DPSP was not understated. And the receiver would have no incentive to make the sender overstate the initial DPSP because the sum of a zero centred normal distribution of DPSP over any reasonably long accounting period would tend to zero.

However, this would introduce an incentive for malicious senders to launch 'denial of funds' attacks on innocent receivers by deliberately understating the initial DPSP. A malicious sender can easily avoid being caught by setting the initial DPSP value low, but still high enough for it to only drop below zero a few networks downstream, before which it will not be detectable. Earlier on the path, where DPSP values are still above zero, any packets with abnormally low DPSP values cannot be distinguished from signals of genuine changes in the congestion state of the downstream path. Even though a network might one day theoretically be able to identify a source in a remote network, it is still costly to enforce punishment in a remote part of the world. The embodiment of the invention to be described does not rely on the introduction of a mechanism that would require complicated procedures to recover money from remote users through international courts or through numerous contracts between otherwise unrelated network providers.

The senders might be remote, but their packets are not. Therefore, In order to penalise (remote) malicious senders, the embodiment of the invention to be described aims to react by punishing packets that have a higher probability of emanating from such sources. Punishment may involve either simply dropping the packet, or possibly truncating it to just its simplest, network layer header, suitably adjusting the packet length field too. Although truncation is potentially useful (e.g. it allows the destination to detect consistent DPSP under-declaration), from here on we will only refer to 'dropping' as a punishment to avoid complicating the discussion.

The present embodiment has the following two aims:
 To avoid a charge between penultimate node and destination in either direction, by intermediate nodes probabilistically dropping some of the most negative packets so as to leave just enough to balance the positive packets;
 Rather than dropping all malicious traffic at the penultimate node, to probabilistically drop some of the highly negative packets at nodes earlier in the path, in order to cut off denial of service/funds attacks earlier in the path, before they consume further network resources.

We start by describing the first step, then extend to the second, which is an optional optimisation to remove malicious traffic before it uses network resources.

Each packet should be penalised with a probability dependent on both how negative the DPSP is in the packet under test and the collective moving average DPSP level of all packets to the same destination. So, if there is no recent history of a negative DPSP balance, no packets at all will be dropped. But if a history of more negative DPSP builds up, packets with the most negative DPSP will be more likely to be penalised, but no more negative DPSP packets will be penalised than there are positive DPSP packets.

It is initially sufficient to maintain one moving average DPSP value for all destinations beyond the egress interface in question, but if there were a persistent tendency to a negative value, moving averages could start to be held for a more focused subset of the traffic (as will be described later).

The following exponentially weighted algorithm may be used for the moving average of the DPSP at the penultimate node, recalculated after each new packet (indexed by j) has its ECL value recalculated during active queue management, but prior to any penalty dropping.

$$\mu_{j+1} = \gamma\rho_n + (1-\gamma)\mu_j; \; 0<\gamma\leq 1. \quad \text{(Equation 4)}$$

where $\gamma$ is a factor that weights recent values relative to historic ones. Packets with an 'uncertain' flag set may be ignored for the purposes of this calculation of the mean, but not when deciding whether to penalise them.

If we assume for the moment that just one flow is arriving at the destination, the moving average $\mu \rightarrow \Delta\rho_c$ (see FIG. 5).

Figure 6:
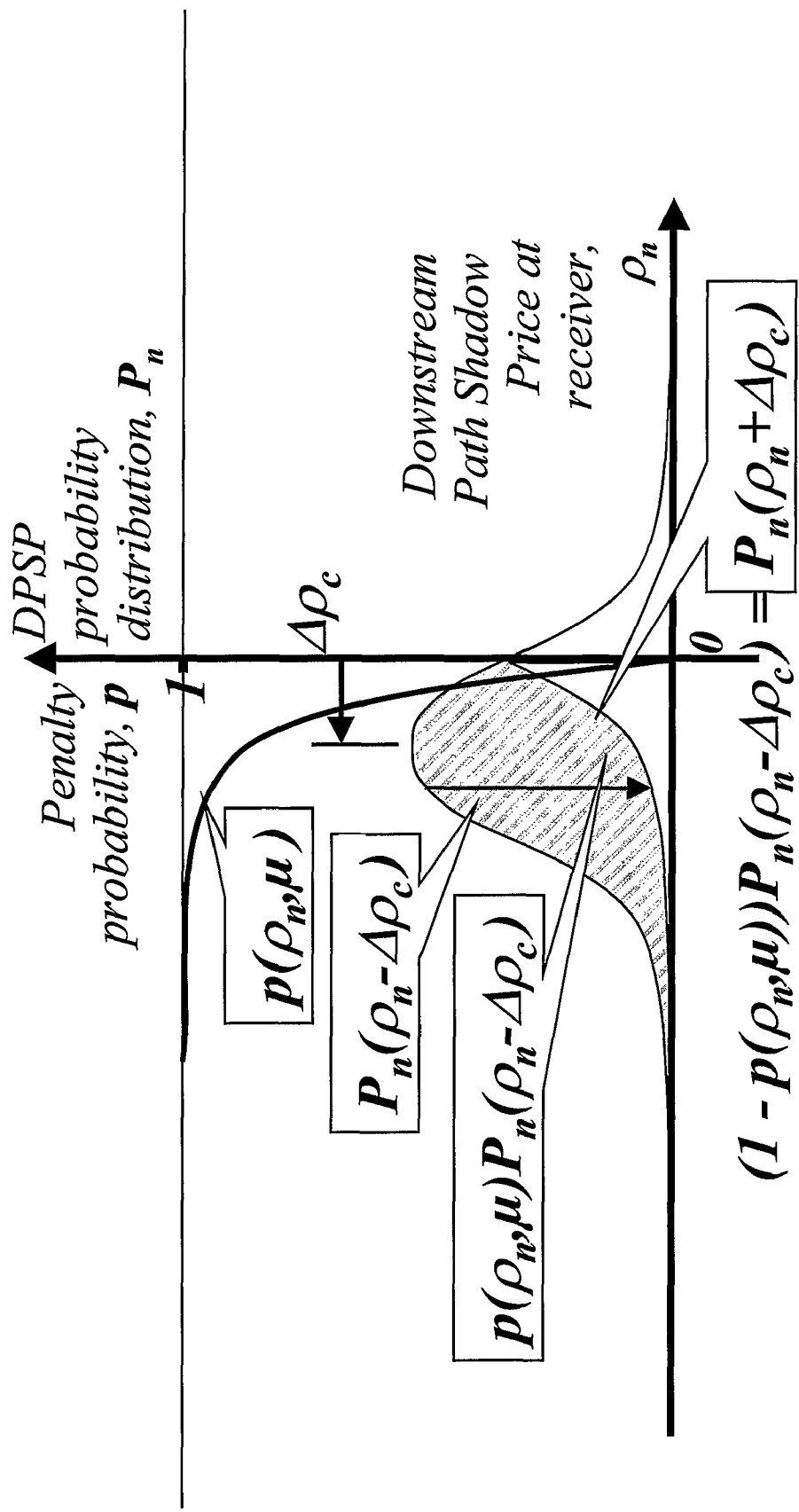

In this context, a packet with a particular DPSP value is penalised with a probability distribution function which depends on the packet's own DPSP value, but also on the current moving average, $\mu$, of recent DPSP values of other packets. FIG. 6 again shows the probability distribution of the DPSP of a 'cheating' packet (before policing), with a possible penalty probability function superimposed on a different vertical scale. A preferred penalty function may be chosen such that the probability distribution of the DPSP values of the packets allowed through the policer without penalty (that is: all the packets with positive DPSP values and those packets with negative DPSP values to which no penalty is applied) is symmetric around the origin, ensuring neither gain nor excessive loss from cheating. This is illustrated in the figure, with the distribution of un-penalised packets shown without shading. We can define such a desired penalty probability function $(1-p(\rho_n, \mu))$ so that the result of its complement to one with the DPSP probability distribution function produces the un-penalised distribution described above, with a symmetric cusp either side of the origin:

(Equation 5)
$$p(\rho_n, \mu) = 0 \qquad \text{for } \rho_n \geq 0 \text{ or } \mu \geq 0$$
$$(1 - p(\rho_n, \mu)) \cdot P(\rho_n - \Delta\rho_c) = P(\rho_n + \Delta\rho_c) \quad \text{for } \rho_n < 0 \text{ and } \mu < 0$$

We assume that $\mu \rightarrow \Delta\rho_c$ and that $\rho_n$ is normally distributed so that we can use the standard formula for a normal distribution, $$P(x) = \frac{1}{\sigma \cdot \sqrt{2\pi}} \cdot \exp\left(\frac{-(x-\bar{x})^2}{2\sigma^2}\right) \quad \text{(Equation 6)}$$

Then we can find the penalty function in terms of $\rho_n$, $\mu$, $\sigma$, where $\sigma$ is the standard deviation of the distribution, which would have to be found by experimental measurement of the spread of final values of packets known to be declared honestly. Re-arranging (5) and substituting from (6) gives:

$$p(\rho_n, \mu) = 0 \qquad \text{for } \rho_n \geq 0 \text{ or } \mu \geq 0 \quad \text{(Equation 7)}$$

-continued $$p(\rho_n, \mu) = 1 - \exp\left(\frac{-2 \cdot \rho_n \cdot \mu}{\sigma^2}\right) \text{ for } \rho_n < 0 \text{ and } \mu < 0$$

Figure 8:
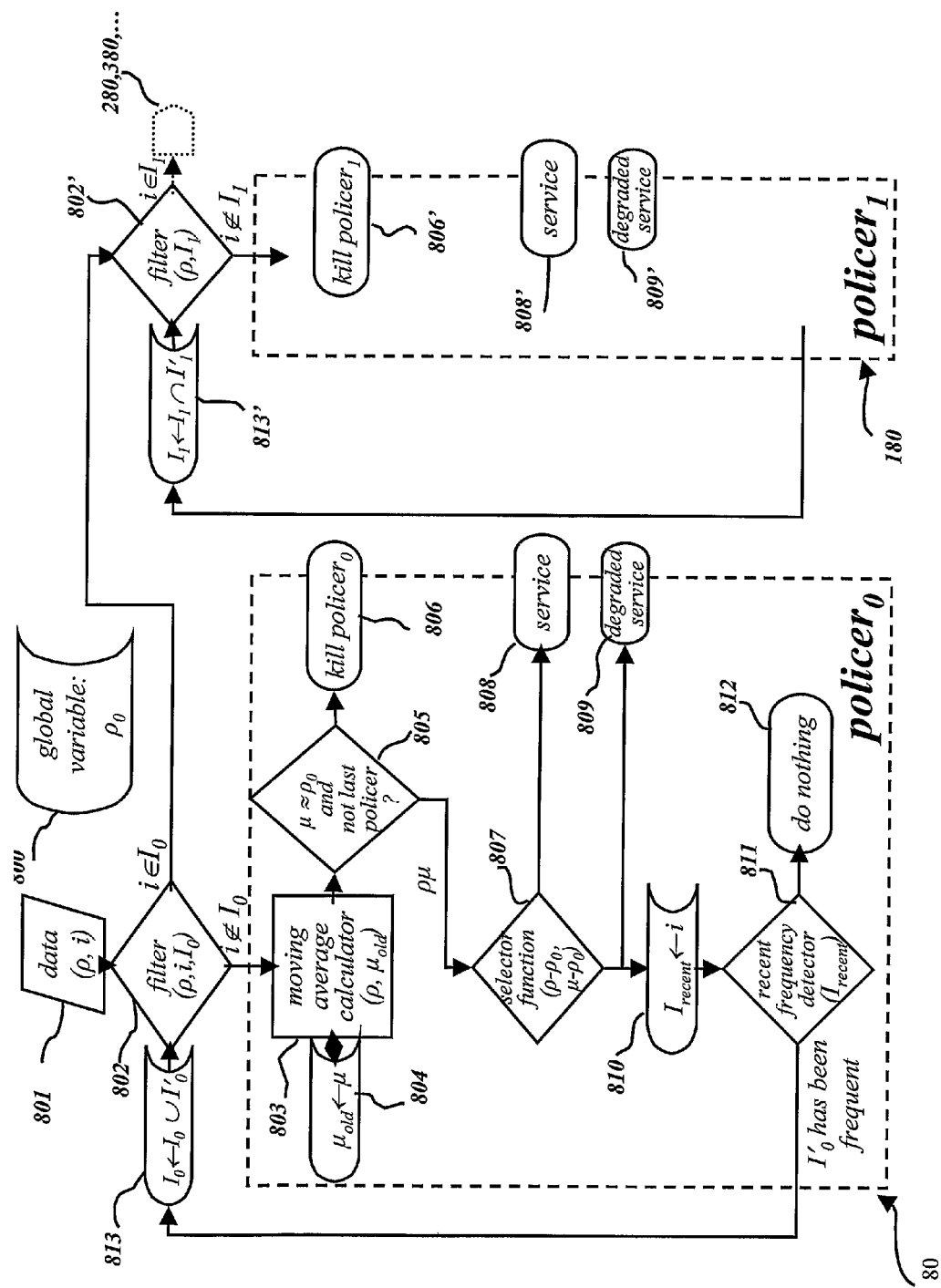
FIG. 8 is a flow diagram illustrating a policing process according to an embodiment of the present invention.

With reference to FIG. 8, the general order of operations on a packet according to this embodiment is:
i) increment ECL to take account of local congestion;
ii) update policer's mean DPSP;
iii) calculate penalty probability, and apply penalty function.
  The following is an example of a suitable deterministic algorithm:
  On policer initialisation v=0.5
  for each packet arrival
  v←v+p(ρ, μ)
  if v≧1 {
    v←v−1
    cache packet details (see below)
    penalise/drop packet}

Figure 7:
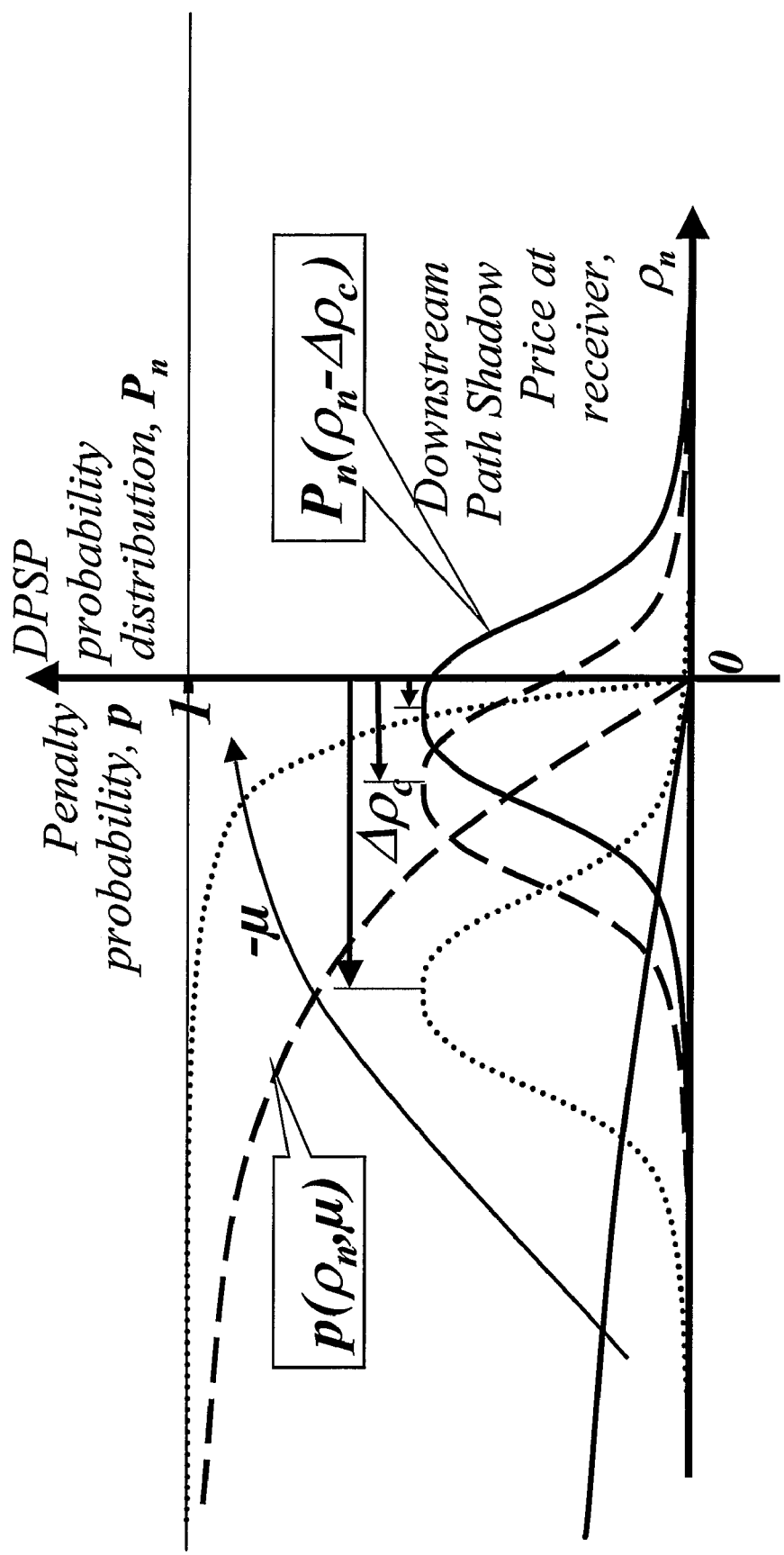

The penalty function of equation 7 adapts as the moving average DPSP value becomes increasingly negative as illustrated in FIG. 7. When the mean DPSP value is nearly zero (solid bell curve) the penalty function (also solid) is very flat. As the mean DPSP moves more negative (dashed then dotted), the penalty function becomes increasingly severe (also dashed then dotted). If, on the other hand, no traffic were malicious, the mean, μ should be zero, so from Equation 7 the policer probability distribution would also be zero, effectively turning off the policer. In preferred embodiments, the policer may be 'tuned' so as not to drop any innocent packets, while at the same time making the moving average sensitive enough so that even short bursts of malicious traffic are caught as quickly as possible, with minimal false positives or false negatives.

In the flow diagram shown in FIG. 8, the steps performed in relation to the policing of incoming traffic as a whole are shown in a box 80 which represents the fundamental policer "policer$_0$". As will be explained later, there are circumstances in which a node according to the invention may effectively create one or more additional policers. One such additional policer, "policer$_1$" is represented by box 180. Since the steps performed by an additional policer correspond generally to those performed by the fundamental policer, box 180 only contains a brief summary of the steps which may be performed by an additional policer.

Leaving aside steps 802, 805 and 806, the relevance of which will only be appreciated once the function of an additional policer has been explained, incoming data packets having headers including their downstream path shadow price (DPSP) ρ and identification information i are received (Step 801), and the moving average of the DPSPs is calculated (Step 803) and stored (Step 804). Capital "I" represents a set of pieces of information "i".

In Step 807, for each packet, the DPSP ρ is compared with a global variable $ρ_0$, which is the predetermined target value for the DPSPs, indicated by Step 800 outside policer$_0$ 80. As before, in order to allow this explanation to be simplified, this target value will be taken to be zero, in order that values on one side of it can correctly be referred to as "positive", while values on the other side of it can correctly be referred to as "negative". As explained earlier, it will be noted however that the predetermined target value need not be zero, of course.

It is in Step 807 that packets whose DPSP is still positive, indicating that they are more likely to have been received from honest sources, are deemed to be deserving of normal or "good" service. They are thus subjected to such service (Step 808) which in the case of an intermediate node in a network may simply mean they are forwarded towards their intended destination. Taking into account the above information together with the moving average calculated in Step 803, certain other packets may then be selected from those whose DPSPs are negative, according to a penalty function such as the probabilistic penalty function explained with reference to Equation 7 above. Such packets may then be subjected to degraded service (Step 809) which may involve being dropped, or otherwise being forwarded to their intended destination, but not in their intended state. "Suspicious" packets could for example be stripped of their payload, but otherwise forwarded, in order to allow nodes downstream, up to and including the eventual receiver, to be provided with information relating to the attempt to send the data packet.

Steps 810 to 813 relate to attempting to filter off flows of packets which are being received from, for example, a source which is regularly or habitually under-declaring DPSPs. Where a malicious flow is just a small part of a large aggregate, even if it is highly negative its effect will be hidden, or at least partly hidden by the many other honest, positive packets. The policer is therefore preferably enhanced in the following manner, in order to work where arriving traffic includes a mix of flows, some malicious and some innocent. The mean of all the innocent traffic should be zero, whereas even a small level of malicious traffic would have a negative mean, so the mean of the mix would be negative. Thus, the policing function would start to kick in, penalising the most negative packets.

In order to achieve this, a cache may be kept of the flow identifiers of packets recently penalised (Step 810), classifying them for example by source and destination addresses and ports. If more of a certain address or address prefix appear in the cache than would be expected by random chance (Step 811), traffic matching that address or combination of addresses should be filtered into a second instance of the policer 180 spawned from the first, which maintains its own moving average of DPSPs it receives. The identification information of the flow suspected of malicious behaviour may be added to a store of such information (Step 813) in order that data packets arriving subsequently may be checked against the "suspect" list, and filtered off in Step 802, prior to them affecting subsequent values of the moving average for the fundamental policer 80. Unless a malicious source is able to spoof any address, this second policer 180 is able to be far more sensitive than the first, but still allow through as many negative packets as positive. Steps 802', 808', 809' and 813' correspond to Steps 802, 808, 809 and 813 described earlier. The second policer 180 may also keep a cache of penalised packets, which may cause it to spawn a third even more sensitive policer (280, 380, . . . ) and so on. If the mean of any policer except the original one had remained zero for a reasonable duration (Step 805), the instance of the policer 180 and the traffic filter 802' feeding it may be "killed" (Step 806') returning its traffic to the original pool. It will be noted that the fundamental policer is prevented from killing itself by the check in Step 805 that the policer concerned is not the last policer. Step 806 should thus never be carried out.

A policer may advise some or all nodes upstream of the particular address combinations it had singled out for focused treatment. Even if the upstream nodes were transmitting a large aggregate within which the malicious traffic was hiding, they could then choose to spawn their own separate policers to watch for the suspect traffic. A similar penalty policy applied at this much finer granularity could deal with the problem further upstream. Upstream policers not on the path from the malicious source(s) would simply find there wasn't a problem and their newly spawned policers would kill themselves off after a time. Once an upstream policer had satisfied itself that this focused discard was worthwhile, it could pass the hint further upstream still, thus placing the filter closer and closer to the source of the problem.

All network operators would have an incentive to weed out negative traffic, because having done so, the level of DPSP crossing into their downstream neighbours would be more positive, increasing overall income. The advisory messages need not even be authenticated, because upstream nodes receiving them can find out for themselves whether the advice is genuine by singling out the advised flow for separate accounting before penalising it. Such an advisory message therefore cannot be used as a form of denial of service itself, as a node will not penalise an honest flow without making its own judgement on the advice given. Also, upstream nodes could limit the rate at which they took heed of these advisory messages to be commensurate with the resources they had available for additional policing. Any nodes that ignore an advisory message just leave the problem to be dealt with downstream.

Note that, earlier, it is recommended that congestion pricing contracts between providers should preferably specify that the sender pays, but that receiver doesn't pay for negative accounts. This advice may be refined such as to also recommend that such contracts should apply to any identifiable subset of traffic, not just the aggregate. This would allow the policing we have described to be put on an appropriate contractual footing.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to". Moreover, for the avoidance of doubt, where reference has been given to a prior art document or disclosure, whose contents, whether as a whole or in part thereof, are necessary for the understanding of the operation or implementation of any of the embodiments of the present invention by the intended reader, being a man skilled in the art, then said contents should be taken as being incorporated herein by said reference thereto.

The invention claimed is:

1. A processing node for processing data items in a data network, said data items having path characterisation metrics associated therewith; said processing node comprising:
    means for receiving data items;
    means for receiving path characterisation metrics associated with said data items, and for identifying characteristic values in respect of said data items from the path characterisation metrics associated therewith; and
    a process selection means including a computer processor, said process selection means comprising:
    deriving means for deriving a collective value from characteristic values identified in respect of a plurality of said data items;
    comparing means for comparing characteristic values identified in respect of each of a plurality of said data items with a predetermined target value;
    means for subjecting data items in respect of which the characteristic values are on a first side of said predetermined target value to a first process;
    selecting means for selecting, according to a predetermined selecting function dependent on said collective value, at least some of said data items in respect of which the characteristic values are on a second side of said predetermined target value; and
    means for subjecting the selected data items to a second process, said second process being different from said first process.

2. A processing node according to claim 1, further comprising means for subjecting at least some of said data items in respect of which the characteristic values are on a second side of said predetermined target value and which were not selected by said selecting means to said first process.

3. A processing node according to claim 1, further comprising means for subjecting at least some of said data items in respect of which the characteristic values are on a second side of said predetermined target value and which were not selected by said selecting means to a third process, said third process being different from said first process and from second process.

4. A processing node according to claim 1, wherein the data network comprises said processing node, at least one upstream node, and at least one downstream node, the or at least one of the upstream nodes being arranged to provide data items to said processing node, and the or at least one of the downstream nodes being arranged to receive data items from said processing node.

5. A processing node according to claim 1, wherein said path characterisation metrics comprise information indicative of a characteristic of a path downstream of said processing node.

6. A processing node according to claim 1, wherein said path characterisation metrics comprise information indicative of a measure of path congestion on a path passing through said processing node.

7. A processing node according to claim 1, wherein said collective value is derived from one or more statistical properties of the characteristic values identified in respect of said plurality of data items.

8. A processing node according to claim 7, wherein said collective value is derived from a measure of the moving average of the characteristic values identified in respect of said plurality of data items.

9. A processing node according to claim 7, wherein said collective value is derived from the exponentially-weighted moving average of the characteristic values identified in respect of said plurality of data items.

10. A processing node according to claim 7, wherein said collective value is derived from a measure indicative of the standard deviation or variance of the characteristic values identified in respect of said plurality of data items.

11. A processing node according to claim 1, wherein said first process comprises forwarding said data items on a path towards an intended destination, and said second process comprises not forwarding said data items on a path towards an intended destination.

12. A processing node according to claim 1, wherein said first process comprises prioritising the forwarding of said data items with respect to said data items subjected to the second process on a path towards an intended destination.

13. A processing node according to claim 1, wherein said first process comprises forwarding said data items in an undegraded form on a path towards an intended destination, and said second process comprises forwarding said data items in a degraded form on a path towards an intended destination.

14. A processing node according to claim 1, wherein said selecting means is arranged to select data items according to a function such that the probability of a data item being selected is dependent on a currently or recently derived collective value.

15. A processing node according to claim 1, wherein said selecting means is arranged to select data items according to a function such that the probability of a data item being selected is dependent on a measure of the difference between the characteristic value of said data item and said collective value.

16. A processing node according to claim 1, wherein said selecting means is arranged to select data items according to a function such that the probability of a data item being selected is dependent on a measure of the difference between the characteristic value of said data item and said target value.

17. A processing node according to claim 1, wherein said selecting means is arranged to select data items according to an adaptive function.

18. A processing node according to claim 1, wherein said selecting means is arranged to select data items according to a function such as to cause a collective value in respect of data items other than those selected by said selecting means to tend towards said predetermined target value.

19. A processing node according to claim 1, wherein said processing node further comprises means for establishing identification information from said data items.

20. A processing node according to claim 19, wherein said identification information is indicative of one or more sources, upstream of said processing node, from which said data items appear to have been received.

21. A processing node according to claim 19, wherein said identification information is indicative of one or more intended destinations, downstream of said processing node, to which said data items appear to be intended to be sent.

22. A processing node according to claim 19, wherein said identification information relates to incoming interfaces, protocol types, sequence numbers, priority classes, security associations, or other information characterising such data items such as to enable the identification of similarities between data items.

23. A processing node according to claim 19, wherein said processing node further comprises means for providing identification information to an upstream node relating to one or more data items selected by said selecting means.

24. A processing node according to claim 19, wherein said processing node further comprises means for storing identification information relating to data items selected by said selecting means, and means for identifying frequently occurring identification information from stored identification information.

25. A processing node according to claim 24, said processing node further comprising means for creating at least one additional process selection means, and means for creating at least one filtering means for re-directing data items matching said frequently occurring identification information to said additional process selection means.

26. A processing node according to claim 25, wherein the or each additional process selection means is arranged to derive a collective value from characteristic values identified in respect of a plurality of data items whose identification information is indicative that they have been received from a common source or group of sources.

27. A processing node according to claim 25, wherein the or each additional process selection means is arranged to derive a collective value from characteristic values identified in respect of a plurality of data items whose identification information is indicative that they are intended to be sent to a common destination or group of destinations.

28. A processing node according to claim 19, said processing node further comprising means for creating at least one additional process selection means.

29. A method for processing data items in a data network, said data items having path characterisation metrics associated therewith; said method comprising the steps of:

receiving data items;

receiving path characterisation metrics associated with said data items, and identifying characteristic values in respect of said items from the path characterisation metrics associated therewith; and a process selection step, said process selection step comprising the steps of:

deriving a collective value from characteristic values identified in respect of a plurality of said data items;

comparing characteristic values identified in respect of each of a plurality of said data items with a predetermined target value;

subjecting data items in respect of which the characteristic values are on a first side of said predetermined target value to a first process;

selecting, according to a predetermined selecting function dependent on said collective value, at least some of said data items in respect of which the characteristic values are on a second side of said predetermined target value; and subjecting the selected data items to a second process, said second process being different from said first process.

30. A method according to claim 29, further comprising a step of subjecting at least some of said data items in respect of which the characteristic values are on a second side of said predetermined target value and which were not selected by said selecting means to said first process.

31. A method according to claim 29, further comprising a step of subjecting at least some of said data items in respect of which the characteristic values are on a second side of said predetermined target value and which were not selected by said selecting means to a third process, said third process being different from said first process and from second process.

32. A method according to claim 29, wherein the data network comprises said processing node, at least one upstream node, and at least one downstream node, the or at least one of the upstream nodes being arranged to provide data items to said processing node, and the or at least one of the downstream nodes being arranged to receive data items from said processing node.

33. A method according to claim 29, wherein said path characterisation metrics comprise information indicative of a characteristic of a path downstream of said processing node.

34. A method according to claim 29, wherein said path characterisation metrics comprise information indicative of a measure of path congestion on a path passing through said processing node.

35. A method according to claim 29, wherein said step of deriving a collective value comprises deriving said collective value from one or more statistical properties of the characteristic values identified in respect of said plurality of data items.

36. A method according to claim 35, wherein said step of deriving a collective value comprises deriving said collective value from a measure of the moving average of the characteristic values identified in respect of said plurality of data items.

37. A method according to claim 35, wherein said step of deriving a collective value comprises deriving said collective value from the exponentially- weighted moving average of the characteristic values identified in respect of said plurality of data items.

38. A method according to claim 35, wherein said step of deriving a collective value comprises deriving said collective value from a measure indicative of the standard deviation or variance of the characteristic values identified in respect of said plurality of data items.

39. A method according to claim 29, wherein said first process comprises forwarding said data items on a path towards an intended destination, and said second process comprises not forwarding said data items on a path towards an intended destination.

40. A method according to claim 29, wherein said first process comprises prioritising the forwarding of said data items with respect to said data items subjected to the second process on a path towards an intended destination.

41. A method according to claim 29, wherein said first process comprises forwarding said data items in an undegraded form on a path towards an intended destination, and said second process comprises forwarding said data items in a degraded form on a path towards an intended destination.

42. A method according to claim 29, wherein said selecting step comprises selecting data items according to a function such that the probability of a data item being selected is dependent on a currently or recently derived collective value.

43. A method according to claim 29, wherein said selecting step comprises selecting data items according to a function such that the probability of a data item being selected is dependent on a measure of the difference between the characteristic value of said data item and said collective value.

44. A method according to claim 29, wherein said selecting step comprises selecting data items according to a function such that the probability of a data item being selected is dependent on a measure of the difference between the characteristic value of said data item and said target value.

45. A method according to claim 29, wherein said selecting step comprises selecting data items according to an adaptive function.

46. A method according to claim 29, wherein said selecting step comprises selecting data items according to a function such as to cause a collective value in respect of data items other than those selected by said selecting means to tend towards said predetermined target value.

47. A method according to claim 29, further comprises a step of establishing identification information from said data items.

48. A method according to claim 47, wherein said identification information is indicative of one or more sources from which said data items appear to have been received.

49. A method according to claim 47, wherein said identification information is indicative of one or more intended destinations to which said data items appear to be intended to be sent.

50. A method according to claim 47, wherein said identification information relates to incoming interfaces, protocol types, sequence numbers, priority classes, security associations, or other information characterising such data items such as to enable the identification of similarities between data items.

51. A method according to claim 47, further comprising a step of providing identification information to an upstream node relating to one or more data items selected by said selecting step.

52. A method according to claim 47, further comprises a step of storing identification information relating to data items selected by said selecting step, and a step of identifying frequently occurring identification information from stored identification information.

53. A method according to claim 52, further comprising a step of creating at least one process selection sub-system, and a step of creating at least one filtering means for re-directing data items matching said frequently occurring identification information to said process selection sub-system.

54. A method according to claim 53, wherein the or each process selection sub-system is arranged to derive a collective value from characteristic values identified in respect of a plurality of data items whose identification information is indicative that they have been received from a common source or group of sources.

55. A method according to claim 53, wherein the or each process selection sub-system is arranged to derive a collective value from characteristic values identified in respect of a plurality of data items whose identification information is indicative that they are intended to be sent to a common destination or group of destinations.

56. A method according to claim 47, further comprising a step of creating at least one process selection sub-system.

* * * * *